United States Patent [19]

Imhof et al.

[11] Patent Number: 5,238,028
[45] Date of Patent: Aug. 24, 1993

[54] METHOD OF SIMULTANEOUSLY SIZING AND FILLING FIBROUS-STRUCTURE ELECTRODE MATRICES FOR RECHARGEABLE BATTERIES WITH AN ACTIVE COMPOUND PASTE

[75] Inventors: Otwin Imhof, Nürtingen; Holger Kistrup, Esslingen, both of Fed. Rep. of Germany

[73] Assignee: Deutsche Automobilgesellschaft mbH, Fed. Rep. of Germany

[21] Appl. No.: 806,891

[22] Filed: Dec. 16, 1991

[30] Foreign Application Priority Data

Dec. 14, 1990 [DE] Fed. Rep. of Germany ....... 4040017

[51] Int. Cl.⁵ .............................. H01M 4/20
[52] U.S. Cl. ...................... 141/1.1; 141/32; 141/33; 29/2
[58] Field of Search .............. 141/1.1, 32, 33; 29/2, 29/623.1, 623.2, 623.3, 623.4, 623.5

[56] References Cited

U.S. PATENT DOCUMENTS

| | | | |
|---|---|---|---|
| 1,629,636 | 5/1927 | Plews | 141/1.1 |
| 2,949,940 | 8/1960 | Lozo | 141/32 |
| 3,432,351 | 7/1969 | Davee et al. | 141/1.1 |
| 3,758,340 | 9/1973 | Adams | 141/1.1 |
| 4,606,383 | 8/1986 | Yanik | 141/32 |
| 4,932,443 | 6/1989 | Karolek et al. | 141/1.1 |

FOREIGN PATENT DOCUMENTS

| | | |
|---|---|---|
| 1078649 | 2/1954 | Fed. Rep. of Germany . |
| 1496289 | 4/1971 | Fed. Rep. of Germany . |
| 2517368 | 10/1975 | Fed. Rep. of Germany . |
| 3817828 | 5/1982 | Fed. Rep. of Germany . |
| 3318629 | 10/1984 | Fed. Rep. of Germany . |
| 3631055 | 5/1987 | Fed. Rep. of Germany . |
| 3632352 | 10/1987 | Fed. Rep. of Germany . |
| 3826153 | 2/1989 | Fed. Rep. of Germany . |
| 3816232 | 7/1989 | Fed. Rep. of Germany . |
| 3822197 | 8/1989 | Fed. Rep. of Germany . |
| 3817982 | 9/1989 | Fed. Rep. of Germany . |
| 3817826 | 5/1990 | Fed. Rep. of Germany . |
| 3921288 | 8/1990 | Fed. Rep. of Germany . |
| 5580272 | 12/1978 | Japan . |
| 0088269 | 7/1980 | Japan ..................... 141/32 |
| 818838 | 8/1959 | United Kingdom .................. 141/32 |

Primary Examiner—Ernest G. Cusick
Attorney, Agent, or Firm—Evenson, McKeown, Edwards & Lenahan

[57] ABSTRACT

A method and apparatus for filling fibrous-structure electrode plaques for rechargeable batteries with an active compound paste, with simultaneous sizing of the plaque. The fibrous-structure electrode plaque is fed by means of a conveyor device to a roll mill whose roll nip is uniformly filled with a flowable active compound paste over the nip width. As the plaque passes through the roll nip, it is filled with active compound paste from both sides, simultaneously sized for thickness, its surface is smoothed and excess paste is removed from the main surface.

25 Claims, 3 Drawing Sheets

METHOD OF SIMULTANEOUSLY SIZING AND FILLING FIBROUS-STRUCTURE ELECTRODE MATRICES FOR RECHARGEABLE BATTERIES WITH AN ACTIVE COMPOUND PASTE

BACKGROUND AND SUMMARY OF THE INVENTION

The present invention relates to a method of filling fibrous-structure electrode plaques for rechargeable batteries with an active compound paste, while at the same time sizing the electrode plaque.

Rechargeable batteries for storing electrical energy in the form of chemical energy (which can then be drawn off again as electrical energy) have been known for a long time. In the lead rechargeable batteries, which are still widely used, the electrodes or plates consist of the active material, which is the actual energy store, and a lead support (grid), which accommodates the active material. For some time there have also been rechargeable batteries containing a novel electrode type, in which an electrode plaque has a fibrous structure. Such batteries are well known to the prior art. For example, German Patent Specification 33 18 629 describes a metallized plastic fiber electrode plaque with a nonwoven fabric base for battery electrodes.

The activation and chemical metallization of nonwoven fabric and needle-punched felt sheets is disclosed in German Patent Specification 36 31 055 and German Patent Specification 36 37 130. German Patent Specification 38 17 828 and German Patent Specification 38 17 826 specify aqueous nickel hydroxide or cadmium oxide pastes for the vibration filling of foam-structure and fibrous-structure electrode plaques. A continuous filling method is furthermore to be found in German Patent Specification 38 22 197 and a method for the vibration filling of foam-structure of fibrous-structure electrode plaques in German Patent Specification 38 16 232. German Patent Specification 38 22 197 also incorporates the removal of the excess paste from the electrode plaque. German Patent Specification 36 32 352 specifies a fibrous-structure electrode plaque with welded-on current take-off terminal, while German Patent Specification 38 17 982 specifies the removal of the paste from the current take-off terminal after the impregnation process. Finally, German Patent Application P 40 18 486.2 specifies a method of producing fibrous-structure electrodes in which the plaque, sized before the mechanical impregnation, is re-sized by compression after the filling operation.

The above review, which is not represented as complete, shows that fibrous-structure electrode technology is at present a field which is being worked on intensively. In practice, however, it is repeatedly found that difficulties and shortcomings occur in the production of fibrous-structure electrode plaques. In particular, the method steps of sizing, filling and removing the excess paste have proven problematic.

Fibrous-structure electrodes are generally produced by a process in which, after activation, metallization and reinforcement by electroplating, the fibrous-structure sheet is cut to size and provided with a current take-off terminal. It is also sized before being filled with active compound, which is necessary in order to be able to produce electrode plaques with defined filling and small fabrication tolerance. In some cases, the fibrous-structure electrode plaque is even sized hot before filling in order to bind projecting fibers superficially, or it is flamed-off. In the latter case however, only the plastic fibers which are not nickel-plated ar reduced.

Most of the energy introduced in the sizing operation is plastic deformation energy, and the lesser part elastic deformation energy. If the active compound is introduced by vibration filling, 96% to 100% of the pores are filled with active compound in the form of known pastes. This process generates substantial noise (vibration of the electrodes, the vibration transmitter(s) or the paste pots), and substantial mess is produced in the form of spattered paste. Moreover vibration filling is difficult to automate.

A further disadvantage of the earlier procedure is that the fibrous-structure electrodes, after first being sized with effort, are stress-relieved by vibration during the impregnation and consequently undergo indeterminate increases in thickness. In addition, during withdrawal from the paste after filling, the electrodes retain enough mass of paste on their surface to correspond on average to approximately the paste mass in the interior of the electrode. This is true, in particular, for electrodes about 2.5 mm thick. For thicker electrodes, less mass than corresponds to the filling of active compound is withdrawn, but on the other hand, in the case of thinner electrodes the effect is the opposite, so that the paste carried out of the impregnation vessel is often a multiple of that which is actually introduced into the fibrous-structure electrodes. The paste adhering to the surface has to be removed by scrapers or brushes or by rotation in a centrifugal field in one or more method steps following the impregnation. In this process, ends of nickel strands not completely bound in the composite, which were pressed into the surface of the fibrous-structure electrode by sizing before impregnation, are additionally often torn out and project in some cases even at right angles from the electrode surface. This problem is particularly prevalent at the cut edges of the electrodes. After filling, cleaning the surface and drying the fibrous-structure electrode, its surface is anything other than flat. As an additional layer, a dried-on film or striation of the paste due to surface cleaning also has a subsequent adverse effect when the fibrous-structure electrode is used.

When such fibrous-structure electrodes are used in the production of cells having prismatic shape, the cell housing becomes quite thick after the assembly of the plate stack and the installation of the plate stack with separators and recombiners as a result of unduly large variations in the individual manufacturing steps, inter alia in the thickness of the individual components (chiefly the positive and negative electrodes). As a result a plurality of such cells cannot be installed in an available steel container (battery tray).

The unduly large manufacturing tolerances in the production of the electrode can also give rise to further disadvantages in the construction and operation of cells containing parts produced in this manner; in particular: that the designed amount of electrolyte corresponding to the volume of the planned housing does not match the volume of the actual, enlarged housing, that the theoretical and calculated porosities and cavity distributions are not achieved in the real cell, that shifts occur in the level of the dischargeable capacity and energy for various loads, that lower Ah and Wh outputs are achieved, that a modified internal cell pressure is established (usually associated with a reduced life of the cell), that a uniform electrode spacing is not ensured as a result of the undefined electrode geometry, that a nonuniform distribution of the amount and concentration of the electrolyte occurs, that the pressure conditions at the individual separators and, consequently, a uniform electrolyte storage (take-up capacity) are disturbed, or that an imbalance results in the fraction of the charge and discharge margin of the negative electrode, in which the negative electrode is greater than the positive electrode.

The resultant roughness, due, inter alia, to a plaque swelling during vibration filling, inadequate removal of all the excess paste from the surface of the electrode after pasting and failure to eliminate such resultant roughness before assembly, result in a high failure rate of the cells due to short circuits. Although resizing after impregnation and drying of the fibrous-structure electrodes does eliminate some of these shortcomings, it is a further operational step in which additional environmental protection measures are required due to the possible dust formation by the dried active material.

The object of the present invention is therefore to provide a method of filling fibrous-structure electrode plaques having current take-off terminals for rechargeable batteries, with an active compound paste under the action of compressive and frictional forces, with simultaneous sizing of the fibrous-structure electrode plaque without the disadvantages specified. In such a procedure, the fibrous-structure electrode plaques produced should have only a small tolerance in the filling, and the individual operational steps previously necessary in filling the fibrous-structure electrode plaque should be carried out in a single method step. That is, the sizing previously carried out before filling the plaque, vibration filling of the plaque, removal of the excess paste from the surface of the plaque after the filling operation and establishment of the final dimensional accuracy necessary for use by a further sizing of the plaque filled with the active compound paste, should therefore be carried out in one working operation.

This object is achieved, according to the invention in which a fibrous-structure electrode plaque with welded-on current take-off terminal is fed vertically from above to two rollers which are situated opposite each other horizontally, and which move in opposite directions to define a feed side in which materials inserted therein will be pulled through the two rollers. The roller nip is adjusted to the thickness of the fibrous-structure electrode to be manufactured with the welded-on current take-off terminal. In setting the nip width, it must be taken into account that the sized fibrous-structure electrode enlarges again after the sizing operation, by the corresponding amount of elastic deformation energy introduced in sizing. The amount of enlargement depends, inter alia, on the nickel coating of the plaque, the ratio of the thickness of the sized electrode to the initial electrode, the modulus of elasticity of the plaque, the cross-linking factor of the nickel-plated fibers in the plaque, the roll diameter of the roll mill and the throughput speed. The working width of the roll mill is set by right-hand and left-hand material strippers at the two roller ends to a working width which corresponds to the width plus the upper tolerance of the electrode to be manufactured.

Other objects, advantages and novel features of the present invention will become apparent from the following detailed description of the invention when considered in conjunction with the accompanying drawings.

DETAILED DESCRIPTION OF THE DRAWINGS

Figure 1:
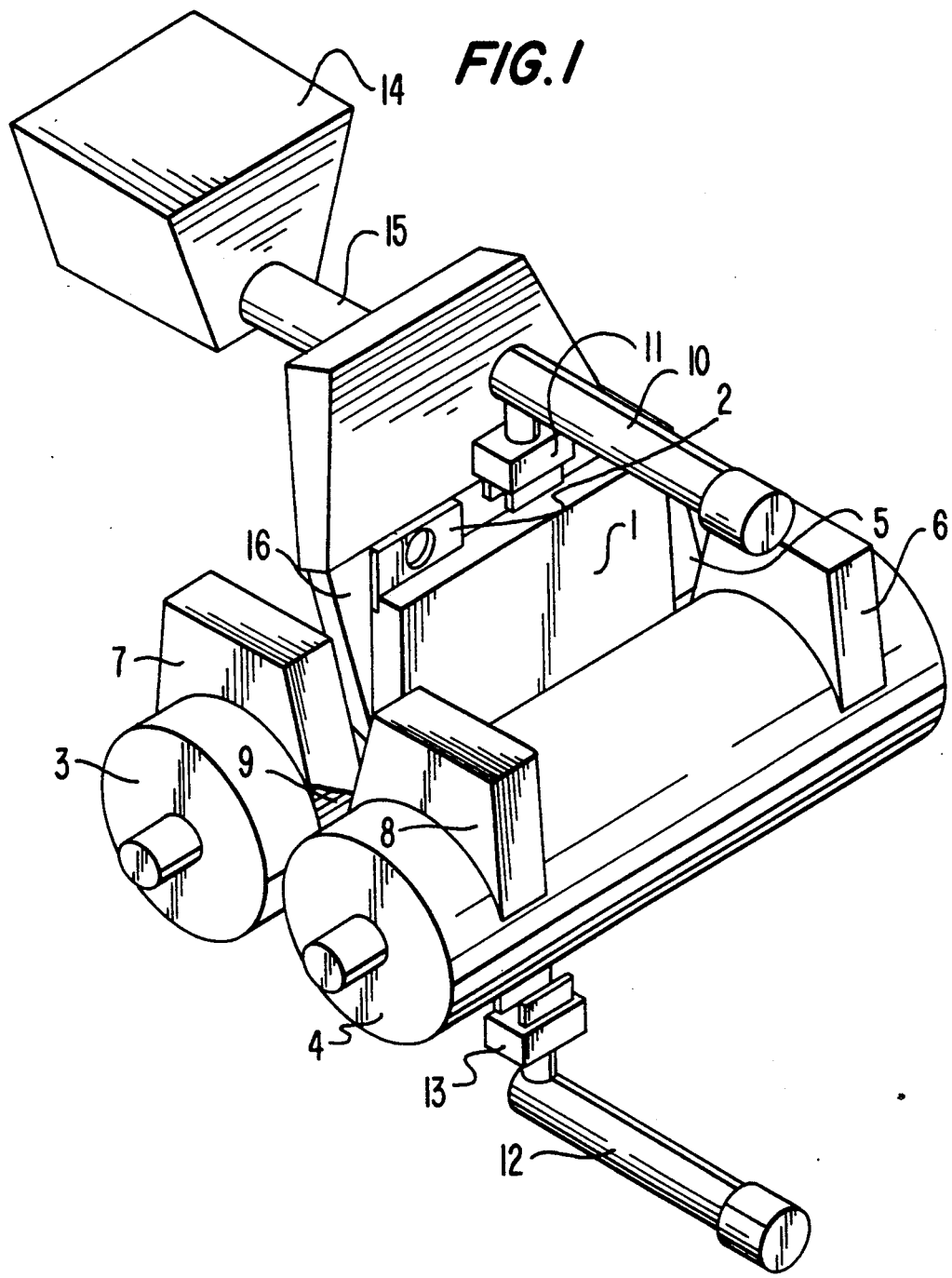
FIG. 1 is a perspective view of an arrangement for carrying out the method according to the invention.
Figure 2:
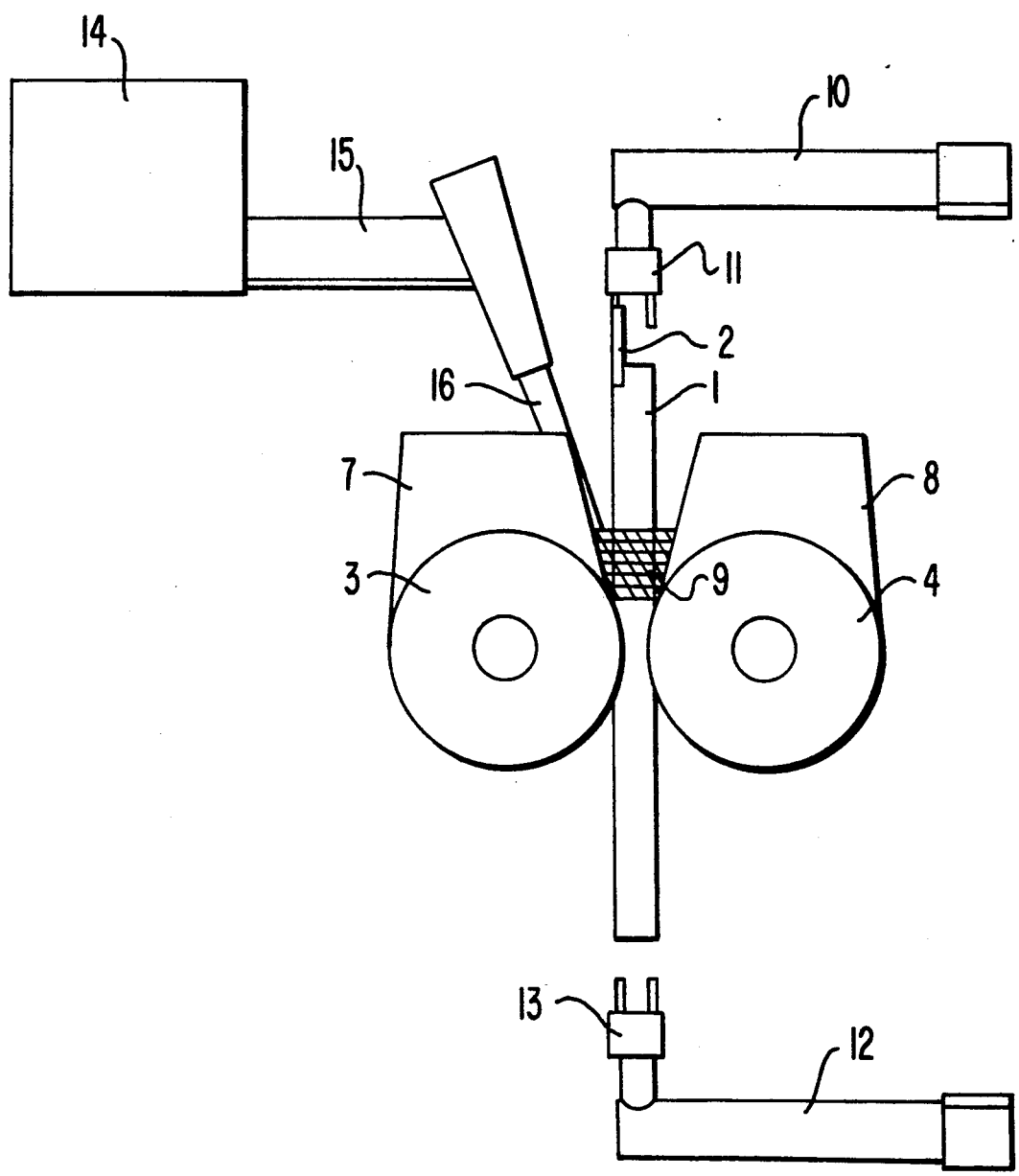
FIG. 2 is a side view of the apparatus of FIG. 1.

Apparatus for carrying out the method according to the invention as shown in FIGS. 1 and 2 of the drawing, in which reference numeral 1 designates a fiber structure electrode plaque having a current take off terminal 2. Rolls 3 and 4, are disposed parallel and adjacent to each other as shown in FIGS. 1 and 2, so to form a wedge shaped area 9 in which the compound paste accumulates and through which the electrode plaque 1 is fed in order to simultaneously impregnate it with the active compound substance, and to size it as described previously. Storage container 14 contains the active compound paste which is fed to the wedge shaped area 9 between the rollers by way of a feeding device 15 having a slotted nozzle 16 which is disposed parallel and adjacent to the wedge shaped area 9, and provides active compound thereto. Material limiters 5, 6, 7 and 8, are arranged near the ends of rolls 3 and 4, and contain the active compound paste in the area therebetween.

In operation, an electrode plaque 1 is transported to the roll mill apparatus by means of a transport device 10 which has a clamping device 11 which grips the electrode plaque at one end thereof. The electrode plaque 1 is inserted into the wedge shaped area 9 between rollers 3 and 4 until it is grasped by the rollers and pulled through the nip area therebetween. (See FIG. 2.) After passing through rollers 3 and 4, the electrode plaque 1 is grasped once again by clamping device 13 of transport element 12 and is removed from the roll mill.

An aqueous nickel hydroxide paste with a high nickel hydroxide content of 28% by volume to 53% by volume (preferably one of approximately 39% by volume), plus 1% by volume of Co and 0.5% by volume of Cd is fed onto the horizontally mounted, adjacently disposed rolls 3, 4 in their center and distributed over the nip width. This paste has a liquid limit of between 20 Pa and 140 pa and a plastic viscosity of 0.05 Pa.s to 1.3 Pa.s, the preferred range being around 0.2 Pa.s The paste has been ground down to such an extent that the particle population (fraction) of solid particles in the paste, which consists of a multiplicity of individual bodies of different size and shape, has a particle size characteristic value of 4 $\mu$m to 10 $\mu$m (D=63.21%), 7 $\mu$m being preferred, and an undersize value of 25% at about 0.2 $\mu$m (when evaluated in a RRSB diagram of particle distribution (distribution network) as devised by P. Rosin, E. Rammler, K. Sperling and I. G. Benett).

Instead of the paste described above, another paste, which is suitable for this purpose is aqueous CdO paste having a CdO content of 15% to 35% by volume, 21% by volume being preferred, with a content of approximately 7% by volume of Cd and of 1% by volume of Ni(OH)$_2$, a plastic viscosity of 0.05 Pa.s to 3 Pa.s, a liquid limit of between 5 Pa and 250 Pa and containing a number of dispersants. Preferred is a slight thixotropy with a liquid limit of 20 Pa and a plastic viscosity of 0.25 Pa.s of the paste, in which case the paste is "liquid"

during the filling operation (described later), but no longer flows out of the wedges and the pores of the filled fibrous-structure electrode with the current take-off terminal after the filling operation, and thickened sections cannot arise, particularly at the lower edge of the electrodes (solidified drainage drops), if the electrodes are handled vertically during the drying operation.

In the filling operation, a film of paste, which has at most the thickness of the set nip between rolls 3 and 4 in FIG. 1, is applied to the circumference around the rolls 3, 4 of the roll mill. The majority of the paste is fed on uniformly over the roll width, which is set to the working width, i.e., the width of the electrode to be manufactured, by material limiters 5, 6, 7, 8, accumulates in the center 9 of the two rolls and is simultaneously mixed and homogenized in this process. Then a fibrous-structure electrode plaque 1 is inserted through the paste built up in excess until it is seized by the rolls 3, 4, drawn through the nip and pressed, in which process, simultaneously with the operation of filling and sizing the fibrous-structure electrode, from now on approximately as much paste is dispensed on both sides of the electrode from the stock container 14 as is removed by the operation of filling the fibrous-structure electrode.

The diameter of the rolls 3, 4 and their circumferential speed determines the throughput speed of the fibrous-structure electrodes through the roll nip. This throughput speed is normally 0.25 m/min to 10 m/min, a throughput speed of about 2.5 m/min being preferred. Once a fibrous-structure electrode has passed through the nip completely, the next one is immediately fed in afterwards from above, it being possible to carry out this operation completely automatically and, consequently, for it to be taken over by automatic handling machines. The fibrous-structure electrode which has passed through the nip is removed from beneath the rolls of the roll mill; this operation can also be completely automated.

The surfaces of the fibrous-structure electrodes filled and simultaneously sized in this way are completely free of excess paste. When the length of the electrode has passed through the nip, only the lower and the upper end faces of the electrode width and the current take-off terminal still have to be cleaned. Then the fibrous-structure electrodes are dried in the shortest time in a likewise automatically operated drying operation, for example with infra-red rays.

Figure 3:
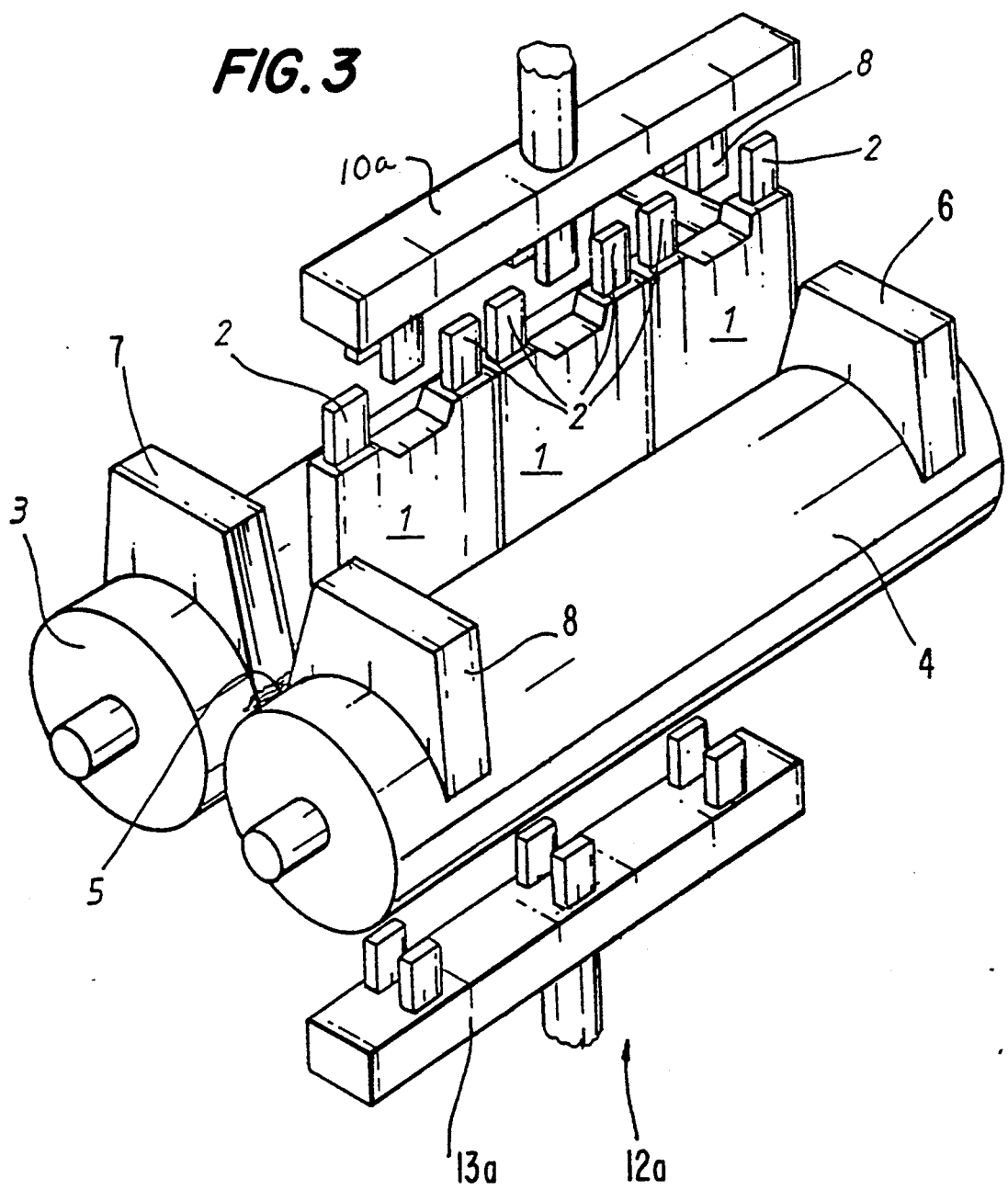
FIG. 3 is a perspective view of an embodiment of the invention in which a plurality of electrode plaques are processed simultaneously.

FIG. 3 illustrates another embodiment of the invention in which a plurality of electrode plaques 1 are inserted side by side into the active paste 5 between rollers 3 and 4, as noted in Examples 2 and 3 hereinbelow. In all other respects, the structure of FIG. 3 corresponds to that of FIG. 1, except that the storage container 14, feeding device 15 and nozzle 16 have been omitted for simplicity. As in FIG. 1, the plaques are transported to the filling apparatus by transport device 10a and are removed by transport element 12a.

The advantages of the method according to the invention are, in particular, that, with a single pass of the fibrous-structure electrode plaque through the roll nip filled with paste, electrodes are produced whose entire fibrous-structure electrode plaque is uniformly filled with the active compound. At the same time the surfaces of the electrodes are flat, free of paste striations or dried-on paste films. The electrodes do not have thickened edges and nickel hollow fiber strands with plastic core no longer inevitably project out of the surface of the electrodes.

The procedure is itself notable for the fact that it involves only one method step instead of four or five working operations to be carried out in succession. Until now, the unfilled fibrous-structure electrode plaque was first sized, then vibration-filled, the excess paste was scraped or spun off the surface of the filled plaque and, finally, the final dimensional accuracy of the plaque was produced by a further sizing operation. In practice, this improvement means that much less space is required to carry out the method of the invention, simply because fewer machines and pieces of equipment are required. The new method also results in an energy saving, and, the very severely disturbing noise sources of the conventional procedures (vibrating plates or the vibrating container in the case of vibratory filling) are also unnecessary. Since fewer pieces of equipment have to be maintained and cleaned, fewer potential sources of environmental pollution are also present.

In addition, more pieces of filled and sized fibrous-structure electrode plaques can be produced by the method according to the invention in unit time (6,000 electrodes per hour), the reject level due to unusable electrodes is substantially reduced and, not least, electrodes of the widest variety of types, dimensions, etc. can be produced with one roll mill.

Finally, it is possible to produce, by the method according to the invention, fibrous-structure electrode plaques which have such high quality, in terms of their constant thickness and surface finish, that cells having a very long operating life can be produced from the resultant electrodes. In particular, cells produced with these fibrous-structure electrodes are very dimensionally accurate.

The invention is explained in still greater detail below with reference to examples:

EXAMPLE 1

The following were loaded into a ball mill having a capacity of 15 liters:

6 kg of $Ni(OH)_2$ having a particle size characteristic value of 11 $\mu m$ (D=63.21%) and a uniformity coefficient of 1.6, corresponding to 39% by volume or 68.4% by mass of $Ni(OH)_2$ 185.5 g of cobalt powder, corresponding to 0.5% by volume or 2.1% by mass, 153.6 g of cadmium powder, corresponding to 0.5% by volume or 1.7% by mass, and 2,440 g of a 0.2 molar dispersant solution of $CoK_{1.5}H_{0.5}$-hydroxyethanediphosphonic acid. This mixture was ground in the ball mill for 20 hours together with cylindrical pebbles. The paste removed had a liquid limit of 45 Pa and a plastic viscosity of 0.4 Pa.s; the upper particle size range determined with a grindometer was 18 $\mu m$.

The impregnating and sizing apparatus consisted of two horizontally mounted rolls (diameter 80 mm, working width 22 mm, rotary speed 10 revolutions/min) with a set nip width of 0.5 mm in order to achieve a thickness of 0.75 mm with the fibrous-structure electrode plaque having welded-on current take-off terminal fed in. The fibrous-structure electrode plaque to be filled and simultaneously sized is an approximately 1 mm thick fibrous-structure electrode plaque consisting of a polypropylene needle-punched felt (needle-punched on both sides; weight per unit area 80 g/cm$^2$; nominal thickness 0.95 mm, thickness of the individual fibers 15 $\mu m$; and staple length 40 mm) which had previously been activated, electrolessly metallized and electroplated with nickel (10 mg of Ni/cm$^2$ of needle-punched felt area). After the electrode plaque had been cut to a width of 110 mm and a height of 116 mm (active area), a neck additionally having a height of 5 mm over a width of 53 mm of the current take-off terminal was provided which was imprinted to a depth of 0.45 mm. A 20 mm long and 0.2 mm thick current take-off nickel-sheet terminal was welded onto this neck.

A throughput speed of the plaque of 2.5 m/min was set during the filling and sizing operation. A first batch of the paste described above was fed onto the two horizontally mounted rolls in a uniformly distributed fashion over the working width. When the fibrous-structure electrodes are fed into the nip of the rolls, they pierce the excess paste which is being mixed and which is fixed in the direction of the nip width by two material limiters. The excess paste is divided in this process into the right-hand and left-hand wedge between the plaque and the roll over the working width.

After leaving the roll nip, paste only had to be removed from the upper and lower end face of the electrode plaque and also from the terminal neck with the current take-off terminal. The electrode plaque had on average a filling of 15.2 g of moist active compound paste and, after drying at 110° C., a filling of 11.4 g of dry active compound paste. The solid mass component of the paste in the plaques was on average 75%. The electrode plaques had acquired a thickness of 0.75 mm as a result of the sizing operation. In the procedure, steps were taken to ensure that at least as much paste is fed to the roll nip from above as is removed with the filled electrode plaque which is passing through. The procedure of the method described resulted in a throughput of the electrodes described above of 20 double electrode/minute or 2,400 fibrous-structure electrode/hour.

EXAMPLE 2

The following were loaded into a ball mill having a capacity of 10 liters:

5 kg of CdO (20.8% by volume or 55.9% by mass), 1,675 g of Cd (6.6% by volume or 18.7% by mass), 120 g of Ni(OH)$^2$ (1.1% by volume or 1.3% by mass) and 2,150 g of a 0.1 molar $Ni_{1.2}K_{1.7}$-HEDP solution. In addition, 18 g of Luviskol VA 73 E (consisting of 70% by weight of vinyl pyrrolidone and 30% by weight of vinyl acetate) were added per 1 liter of dispersant solution. This mixture was rolled for about 6 hours with 3 kg of grinding balls. The flowable CdO paste obtained had a liquid limit of 34.6 Pa with a plastic viscosity of 0.4 Pa.s A portion of this paste was fed in a uniformly distributed fashion onto two horizontally mounted rolls (diameter 150 mm, working width 350 mm, rotary speed 6 rev/min). The set nip width was 0.35 mm for a desired electrode plaque thickness of 0.5 mm. The fibrous-structure electrode plaques were polypropylene needle-punched felt sheets (needle-punched on both sides) having a weight per unit area of 80 g/m$^2$, with a nominal thickness of 0.95 mm, a thickness of the individual fibers of about 15 $\mu$m and a staple length of 40 mm. This fibrous structure had previously been activated, electrolessly metallized and electroplated with nickel in a Watt nickel-plating bath. The deposit obtained was 50 mg of Ni/cm$^2$ of needle-punched felt area.

After cutting to an active area having a height of 116 mm and a width of 110 mm with a terminal neck having an additional height of 5 mm over a width of 53 mm which was impressed to a depth of at least 0.3 mm, a 20 mm high and 0.2 mm thick current take-off nickel-plate terminal neck having an additional height of 5 mm over a width of 53 mm which was impressed to a depth of at least 0.3 mm, a 20 mm high and 0.2 mm thick current take-off nickel-plate terminal was spot welded onto said terminal neck. Several unisized fibrous-structure electrode plaques having an approximate thickness of 1 mm and with welded-on current take-off terminal were then fed to the roll nip one behind the other and one beside the other by means of a conveyor device. On entering the roll nip filled with an excess of paste, the current take-off terminals first penetrated the paste, were seized by the rotating rolls and were pulled through the roll nip with the electrode plaque. In this process, an excess of paste existed on the inside in the left-hand and right-hand wedge between the electrode plaques and the respective roll. At the same time, care was taken to ensure that at least the amount of paste was replenished from above as was removed with the filled electrode plaques passing through. The throughput speed of the electrode plaques was about 2.8 mm/min. The paste was then removed from the current take-off terminals with the terminal neck and the upper and lower end faces of the electrode plaque.

The individual electrode plaque had a filling of moist active compound paste of 14.4 g and, after drying, a filling of 11.6 g of dry active compound paste. The solid proportion by mass of paste in the plaques is found to be 79.8%. The procedure described resulted in a throughput (with three electrode plates each 330 mm wide distributed simultaneously over the nip width) of 60 electrode plates/minute or 3,600 electrode plates/hour. In the procedure, the paste was fed continuously to the roll nip from a stock container disposed above the roll mill.

EXAMPLE 3

A needle-punched sheet having a weight per unit area of 20 mg/cm$^2$ and a nickel coating of 150 mg of Ni/cm$^2$ was filled with a paste composition in accordance with Example 1.

The plaque, which was reinforced by nickel plating, had a thickness of 2.9 mm. The format of the electrodes was so designed that it was 130 mm high on the left-hand side of the plaque over a width of 20 mm, with the height decreasing on the right towards the right-hand edge to a total height of the electrode of 124.4 mm. A 14 mm wide and 21.5 mm long current take-off terminal made of 0.2 mm thick nickel sheet was welded to the electrode plaques. The electrode plaques were fed by means of a conveyor device to the roll mill, whose two rolls had a diameter of 300 mm, with a working width of 650 mm and a roll rotary speed of 8 min$^{-1}$. At the same time not more than 8 (partially separated) plaques were introduced side by side into the roll nip, which had a nip width of 2.4 mm. The electrode plaques were further treated as described in the preceding examples. The thickness of the electrode plaques filled with paste was 2.4 mm, with a filling quantity of 31.2 g of moist and 23.5 g of dry active compound paste. With an assumed porosity of 85% for the plaque, the theoretically calculated filling factor was 0.96. A plaque throughput speed through the roll nip of approximately 2 m/min resulted in a throughput of 100 paste-filled electrodes per minute or 6,000 filled electrodes per hour.

EXAMPLE 4

A fibrous-structure electrode plaque of needle-punched felt having a weight per unit are of 37.3 mg/cm$^2$ and a nickel coating of 150 mg/cm$^2$ of needle-punched felt area was treated as specified in Example 3. The thickness of the plaque before the impregnation and sizing was 4.8 mm with a porosity of 88%. After a first impregnation and sizing, the electrode plaque had a filling of 89% of moist active compound paste. This was an indication that an adequately large supply of paste had not been available in this impregnation and sizing. The inadequately filled electrode plaque was again fed through the roll nip with an adequate supply of paste and then had a filling of 97%. After a third passage, the plaque had a filling of 53.3 g of moist active compound paste and of 41.9 g of dry active compound paste; 97% of the pores of the sized fibrous-structure electrode were filled with the active compound paste.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of filling fibrous-structure electrode plaques for rechargeable batteries with an active compound paste under the action of compressive forces, said method comprising the steps of:
   providing a roll mill comprising first and second cylindrical rollers arranged parallel and adjacent to each other, separated from each other by a nip having a selected width, and forming a V-shaped area adjacent and coextensive with said nip;
   filling said V-shaped area with said paste, uniformly along a length thereof;
   rotating said rollers in opposite directions;
   inserting at lest one said electrode plaque into said paste in said V-shaped area so that paste contained therein contacts said at least one electrode plaque on both sides thereof, to a point where it enters said nip and is rolled between said rotating rollers, whereby said at least one electrode plaque is simultaneously filled with said paste from both sides thereof and sized as it passes through said paste and between said rollers.

2. Method according to claim 1, wherein said at least one electrode plaque is transported by means of a conveyor device to the roll mill.

3. Method according to claim 1, wherein a width of the roll nip is smaller than a thickness of said at least one electrode plaque after filling and sizing.

4. Method according to claim 1, wherein the nip is provided in the region of the axial roll ends with material limiters whose spacing measured in the axial direction relative to said rollers corresponds to a total width of said at least one electrode plaque which are inserted into said nip.

5. Method according to claim 4, wherein a plurality of electrode plaques are inserted into said nip simultaneously, with edges thereof adjacent each other.

6. Method according to claim 1, wherein said rolls have a diameter of 50 to 500 mm; and
   the throughput speed of said at least one electrode plaque is between 0.5 m/min and 10 m/min.

7. Method according to claim 1, wherein said at least one electrode plaque comprises one of: a nonwoven fabric sheet and a sheet of needle-punched felt, which has:
   a sheet thickness of 0.25 to 5.0 mm;
   a porosity of the untreated sheet of 50 to 97%; and
   a weight per unit area of the untreated sheet of 50 to 800 g/m$^2$;
   plastic fibers of having a diameter of 0.5 to 7.3 dtex, and a length of 15 to 80 mm;
   said fibers having been activated, electrolessly metallized and reinforced with a metal layer by electroplating, and
   said at least one electrode plaque having a nickel coating of 30 mg of nickel/cm$^2$ to 280 mg of nickel/cm$^2$.

8. Method according to claim 1, wherein said electrode plaques have a current take-off terminal applied to an unfilled electrode plaque before pasting, which has a thickness which is at least 10% less than thickness of said at least one electrode plaque.

9. Method according to claim 1,
   wherein said active compound paste has a content of 28 to 53% by volume of nickel hydroxide, a liquid limit range of 20 to 140 Pa, and a plastic viscosity of 0.05 to 1.3 Pa.s; and
   wherein a particle population of solid particles in the paste has a particle size characteristic value of 4 to 10 $\mu$m, with a grindometer value of 8 to 25 $\mu$m, and an undersized value of 25% at approximately 0.2 $\mu$m.

10. Method according to claim 1, wherein the active compound paste has a content of 15 to 35% by volume of cadmium oxide, 7% by volume of cadmium and 1% by volume of nickel hydroxide, has a liquid limit range of 5 to 250 Pa, and has a plastic viscosity of 0.05 to 3 Pa.s.

11. Method according to claim 8, wherein the active compound paste contains at least one dispersant.

12. Method according to claim 5, wherein said electrode plaques are simultaneously red to the roll mill by a conveyor device and wherein, after the electrode plaques have been gripped by the rolls, they are released from the conveyor device and are simultaneously filled with active compound paste and sized on passing through the rolls.

13. Method according to claim 1, wherein with increasing thickness of the said at least one electrode plaque, a larger roll diameter and a lower rotary speed are chosen for the rolls.

14. Method according to claim 1, wherein paste volume absorbed in said at least one electrode plaque is fed from outside uniformly over the nip width and preferably to both sides of said at least one electrode plaque.

15. Method according to claim 1, wherein after passing through the roll nip completely and being filled and sized, said at least one electrode plaque is removed by a conveyor device and excess paste is removed from upper and lower end faces and the welded-on current take-off terminals.

16. Method according to claim 1, wherein a uniform excess of past is maintained over a width of the nip on rolling the active compound paste into said at least one electrode plaque.

17. Method according to claim 1, wherein after having been paste-filled and cleaned; said at least one electrode plaque is dried before removal from the conveyor device.

18. Method according to claim 1, wherein said at least one electrode plaque, simultaneously filled and sized, is separated after the drying operation.

19. Method according to claim 1, wherein the active compound paste is continuously dispensed into the roll nip by means of a thick matter pump from a stock container.

20. Apparatus for filling fibrous structure electrode plaques for rechargeable batteries with an active compound paste under the action of compressive force, comprising:

a roll mill having first and second cylindrical rollers arranged in parallel and adjacent to each other, separated from each other by a nip having a selected width, and forming V-shaped areas adjacent and coextensive with said nip;

means for rotating said rollers in opposite directions whereby a feed side of said rollers is defined;

means for filling said V-shaped area on said feed side of said rollers with said paste, uniformly along a length thereof;

means for inserting at least one said electrode plaque into said paste in said V-shaped area so that paste contained therein contacts said at least one electrode plaque on both sides thereof, to a point where it enters said nip and is rolled between said rotating rollers whereby said at least one electrode plaque is simultaneously sized and filled with said paste from both sides thereof as it passes through said paste and between said rollers.

21. Apparatus according to claim 20, wherein said means for inserting comprises a conveyor device for transporting said at least one electrode plaques to said nip.

22. Apparatus according to claim 20, wherein the width of said nip is smaller than a desired thickness of said at least one electrode plaque after filling and sizing.

23. Apparatus according to claim 20, wherein said roll mill further comprises material limiters for containing said paste in a desired portion of said V-shaped area.

24. Apparatus according to claim 20, wherein said means for filling continuously fills said V-shaped area with paste as it is removed therefrom by filling of said at least one electrode plaque.

25. Apparatus according to claim 20 which further comprises a conveyor means for removing said at least one electrode plaque from said roll mill, and means for removing excess paste from upper and lower end faces of said at least one electrode plaque.

* * * * *